(12) United States Patent
Wang et al.

(10) Patent No.: US 7,681,211 B2
(45) Date of Patent: Mar. 16, 2010

(54) MECHANISM FOR GUIDING AIRFLOWS WITHIN OPTICAL DISC DRIVE

(75) Inventors: Wen Hong Wang, Hsinchu (TW); Jui Nan Chuang, Hsinchu (TW); Jeng Jiun Chen, Hsinchu (TW); Yu Feng Chien, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 382 days.

(21) Appl. No.: 11/390,146

(22) Filed: Mar. 28, 2006

(65) Prior Publication Data

US 2006/0282842 A1     Dec. 14, 2006

(30) Foreign Application Priority Data

Dec. 6, 2005     (TW) .............................. 94142957 A

(51) Int. Cl.
*G11B 33/14* (2006.01)
*G11B 33/08* (2006.01)
(52) U.S. Cl. ........................ 720/648; 720/601
(58) Field of Classification Search ......... 720/601–616, 720/648, 649
See application file for complete search history.

(56) References Cited

U.S. PATENT DOCUMENTS

| | | | |
|---|---|---|---|
| 4,845,700 A | * | 7/1989 | Koizumi et al. ............. 720/615 |
| 6,700,850 B2 | * | 3/2004 | Takahashi et al. ........... 720/601 |
| 2001/0026520 A1 | * | 10/2001 | Watanabe et al. .......... 369/75.2 |
| 2003/0185131 A1 | * | 10/2003 | Choi .......................... 369/75.2 |
| 2004/0004928 A1 | * | 1/2004 | Choi .......................... 369/75.2 |
| 2005/0097581 A1 | * | 5/2005 | Kadowaki et al. ........... 720/601 |
| 2006/0005214 A1 | * | 1/2006 | Kim et al. ................... 720/648 |

FOREIGN PATENT DOCUMENTS

| | | | |
|---|---|---|---|
| JP | 61224190 A | * | 10/1986 |
| JP | 11053876 A | * | 2/1999 |
| JP | 2000187914 A | * | 7/2000 |
| JP | 2004303286 A | * | 10/2004 |

* cited by examiner

*Primary Examiner*—William J Klimowicz
(74) *Attorney, Agent, or Firm*—Muncy, Geissler, Olds & Lowe, PLLC

(57) ABSTRACT

The present invention relates to a mechanism for guiding airflows within an optical disc drive, in which the optical disc drive comprises a chassis having a side wall and a tray for loading or unloading a disc. The guide mechanism of the present invention includes at least one guide passage which is protruded outwardly from the side wall of the chassis and has two guiding oblique surfaces at its both ends. Further, the guide passage is positioned on an extended line of a diameter of the disc normal to the side wall of the chassis. The airflows produced by the revolving disc is guided to flow through the guide passage. According to the guide mechanism the shocks, jarring, and noise of the optical disc drive is minimized.

12 Claims, 8 Drawing Sheets

MECHANISM FOR GUIDING AIRFLOWS WITHIN OPTICAL DISC DRIVE

This Non-provisional application claims priority under 35 U.S.C. §119(a) on Patent Application No(s). 094142957 filed in Taiwan, Republic of China on Dec. 6, 2005, the entire contents of which are thereby incorporated by reference.

BACKGROUND OF THE INVENTION

1. Field of Invention

The present invention relates to a mechanism for guiding airflow within an optical disc drive and more particularly to a mechanism disposed in an optical disc drive for guiding airflows produced by a revolving disc.

2. Related Art

A conventional optical disc drive is shown in FIGS. 1, 2, and 3. The optical disc drive comprises a housing 10 including a front cover 11, a tray 12, and a chassis 13 on which an optical pickup module 131 and a tray loading mechanism 121 are provided. The chassis 13 is provided in the housing 10. The tray loading mechanism 121 is adapted to either draw out the tray 12 or push the tray 12 into the chassis 13. The optical pickup module 131 lifts after the tray 12 loads a disc D into the chassis 13. A revolving spindle of the optical pickup module 131 then inserts into a center hole of the disc D for coupling and rotates the disc D. Thus, an optical pickup unit 132 of the optical pickup module 131 is able to read data recorded on the disc D.

For assembling into a computer, the chassis 13 is usually designed as a rectangle, thus when the disc D having a diameter of 12 cm is carried into the chassis 13, there is a narrow area between the disc D and the long side wall of the chassis 13 (see FIG. 2). Thus, the airflow field generated by the revolving disc D (as indicated by arrows in FIG. 3) may have turbulence at the narrow areas. The turbulence may cause unbalance air pressure above the disc D. As a result, shocks, jarring, and noise are generated that will adversely affect the data reading function of the optical drive.

Moreover, when the optical disc drive is intended to be used in a vertical position, a projection 133 is typically formed on each long side of the chassis 13 for stably positioning the disc D on the tray 12 so as to facilitate the spindle to precisely insert into the center hole of the disc D. In other words, the provision of the projections 133 aims at correctly positioning the disc D on the tray 12. However, the projections 133 may further decrease the space in the narrow areas. As such, turbulence becomes more serious, resulting in a worse condition of the generated shocks, jarring, and noise. Thus, there still needs a solution for resolving the above problems.

SUMMARY OF THE INVENTION

It is an object of the present invention to provide a guide mechanism for guiding the airflows in an optical disc drive to balance the air pressure above the optical disc resulted from the airflows produced by the revolving disc and minimize the shocks, jarring, and noise when operating the optical disc drive.

The present invention provides a guide mechanism for guiding the airflows in an optical disc drive, wherein the optical disc drive includes a chassis including a side wall and a tray for loading and unloading a disc. The guide mechanism comprises at least a guide passage which is protruded outwardly from the side wall of the chassis and has two guiding oblique surfaces positioned at its both ends. Further, the guide passage is positioned on an extended line of a diameter of the disc normal to the side wall of the chassis. The airflows produced by the revolving disc is guided to flow through the guide passage.

According to the preferred embodiment of the present invention, the guide mechanism further provided with a rib which is provided in the guide passages for positioning the loaded disc when the optical disc drive is intended to be used in a vertical function.

According to the preferred embodiment of the present invention the guide passage is further divided into a front channel and a rear channel, and the airflows enter the guide passage at the front channel and exit the guide passage at the rear channel.

According to the preferred embodiment of the present invention an angle formed between each of the guiding oblique surfaces and the side wall of the chassis is an obtuse angle, and a length of the front channel is longer than that of the rear channel.

The above and other objects, features and advantages of the present invention will become apparent from the following detailed description taken with the accompanying drawings.

DETAILED DESCRIPTION OF THE INVENTION

Figure 1:
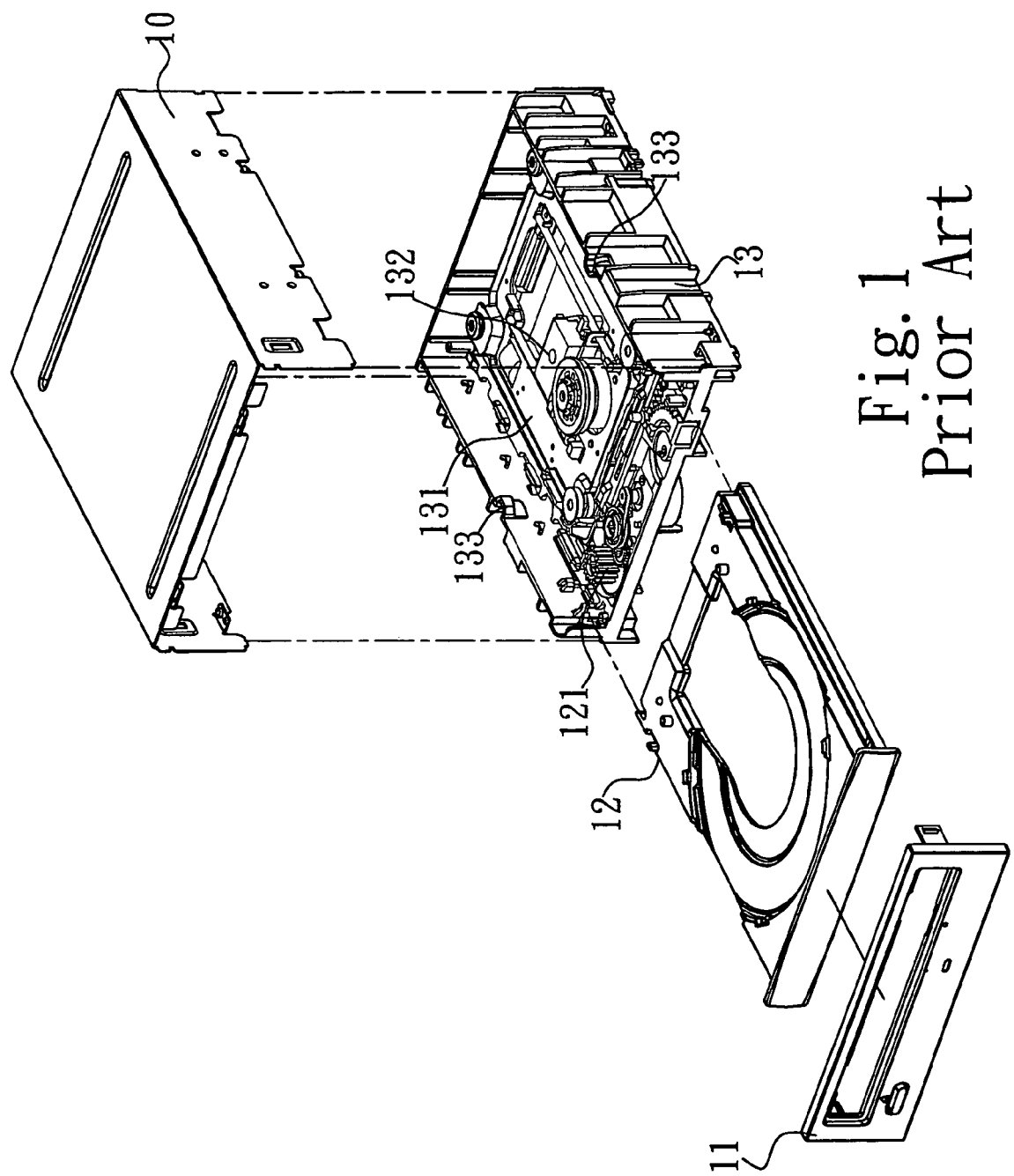
FIG. 1 is an exploded perspective view of a conventional optical disc drive.
Figure 2:
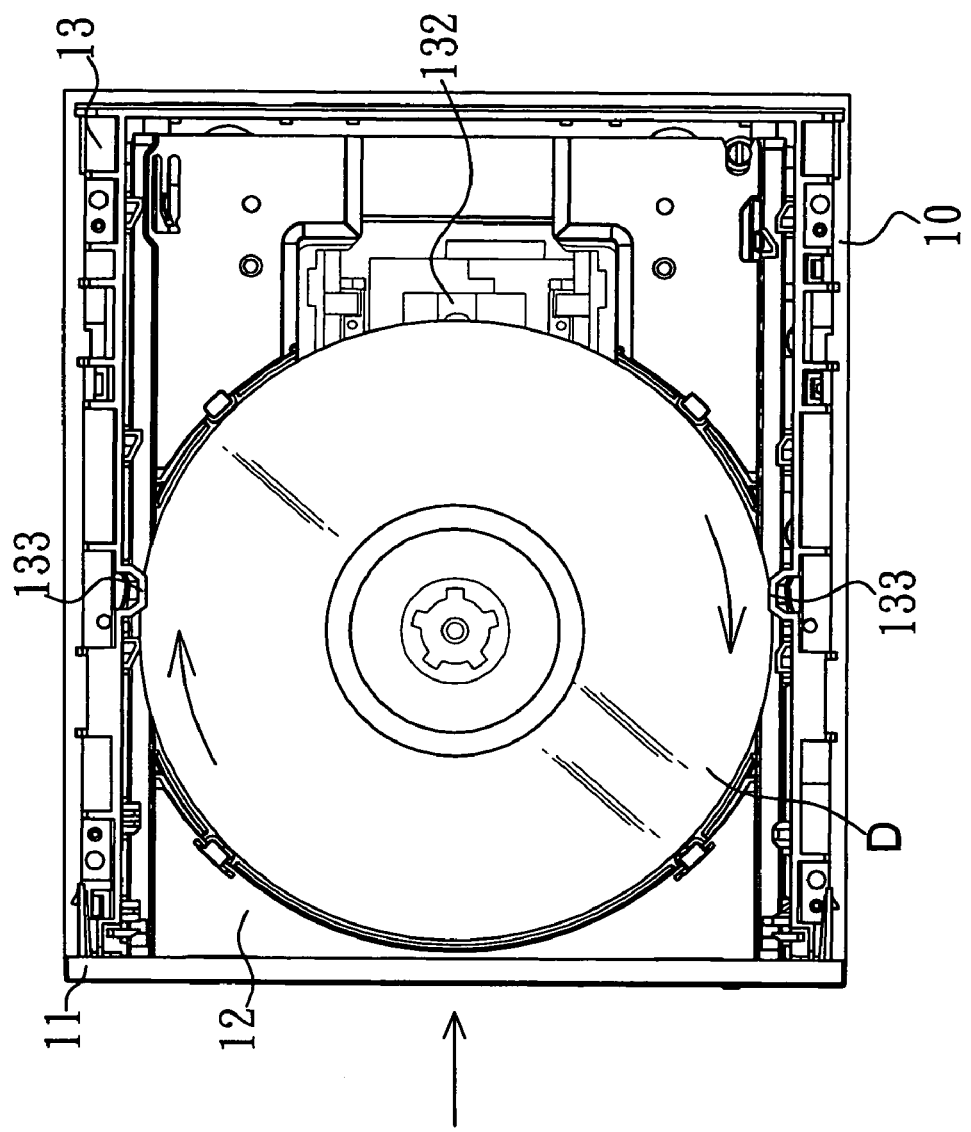
FIG. 2 is a top view showing a conventional optical disc drive in which a disc is loaded in the optical disc drive.
Figure 3:
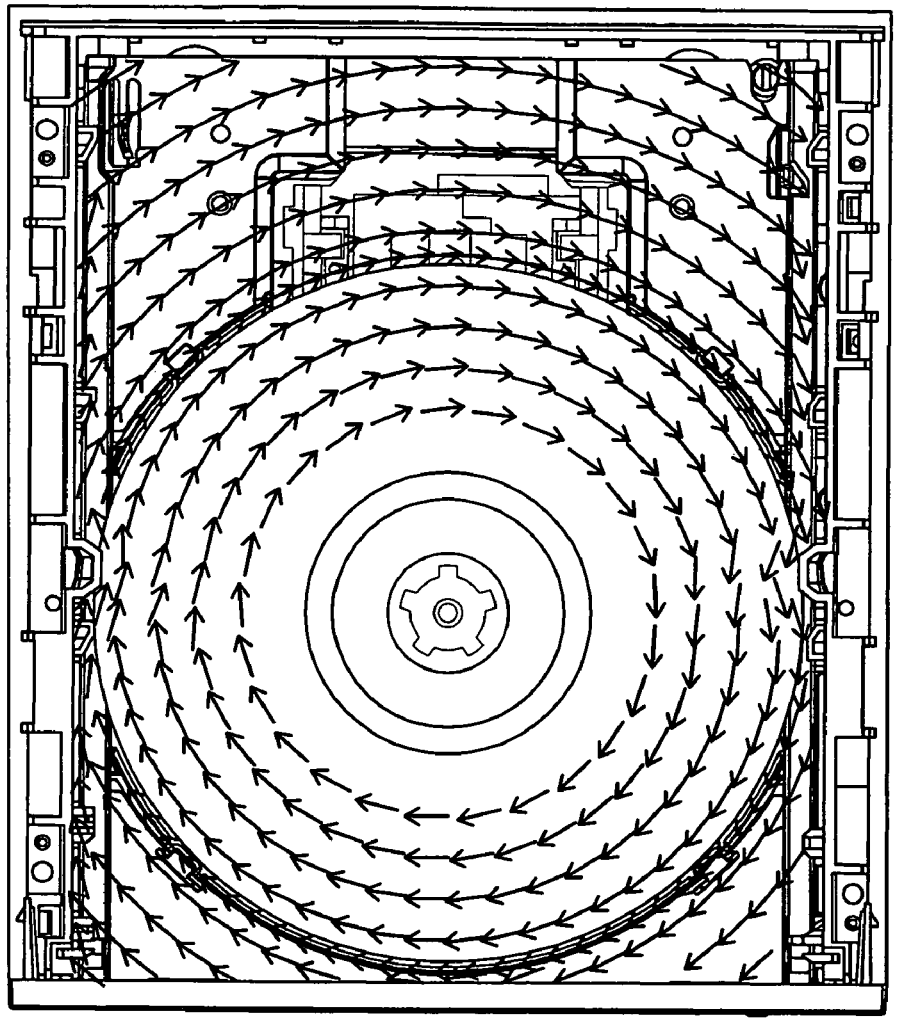
FIG. 3 is a view illustrating the airflow field produced by the revolving disc as shown in FIG. 2.
Figure 4:
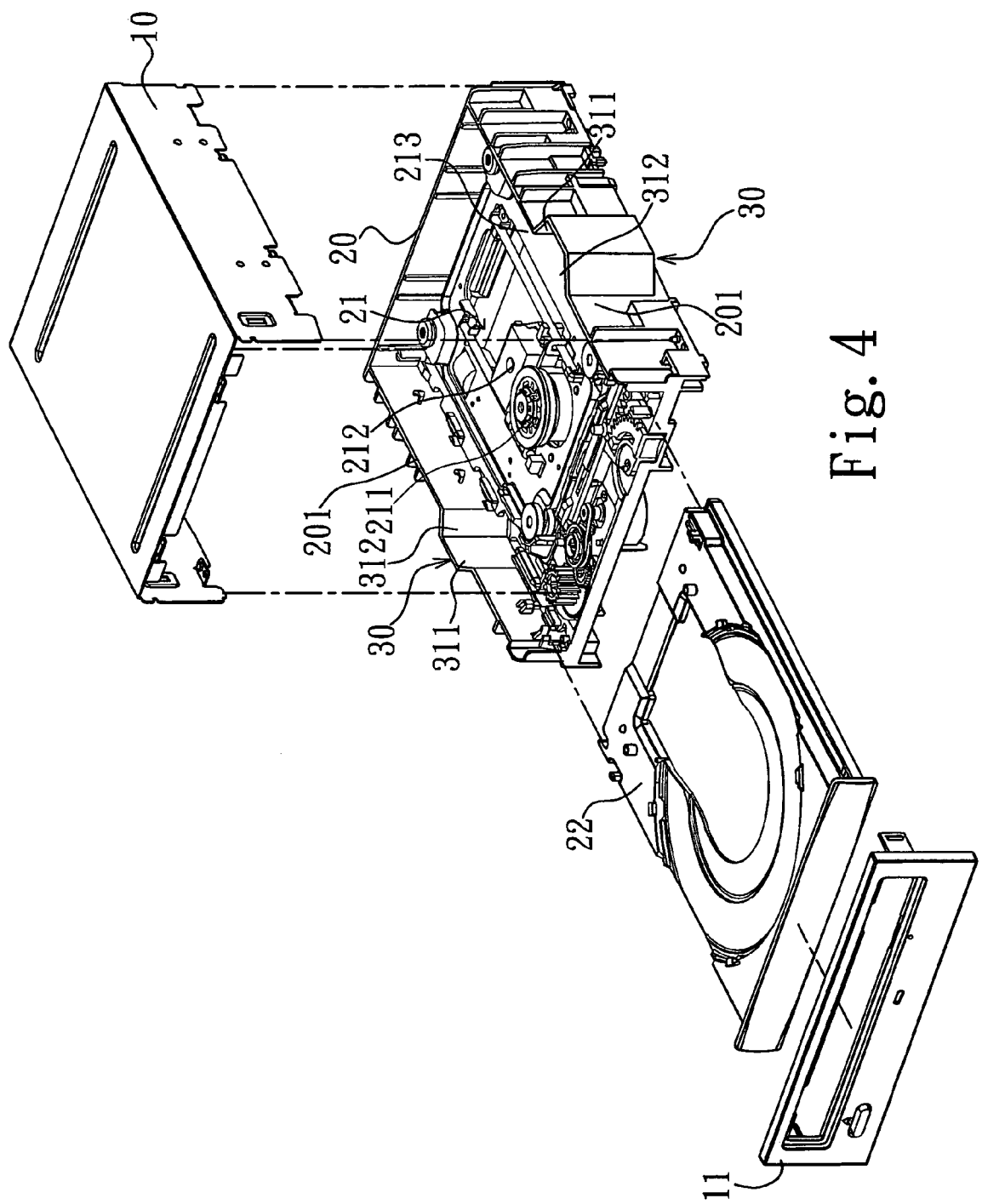
FIG. 4 is an exploded perspective view of an optical disc drive provided with the mechanism for guiding airflows within the operating optical disc drive according to one embodiment of the present invention.

Referring to FIG. 4, a guide mechanism disposed in an optical disc drive for guiding airflows therein according to a preferred embodiment of the invention is shown. The optical disc drive comprises a housing 10, a retractable tray 22, and a chassis 20 provided within the housing 10. The tray 22 is disposed on the chassis 20 and the housing 10 comprises a front cover 11 having an opening for permitting the tray 22 to be drawn out of the chassis 20 or to be pushed therein. On the chassis 20 there is provided with a tray loading mechanism for loading or unloading the tray 22, and an optical pickup module 21 including an optical pickup unit 212, a spindle motor 211, and a base 213 mounted on the chassis 20 for mounting both the spindle motor 211 and the optical pickup unit 212 thereon. The base 213 is raised to insert the spindle motor 211 into a center hole of a disc D for positioning the disc D being loaded into the chassis 20. Thereafter, the optical pickup unit 212 is activated to read data recorded on the disc D. After operating, both the base 213 and the spindle motor 211 are lowered to unload the disc D, and the tray 22 is drawn out of the chassis 20 for a user replacing the disc D.

Figure 5:
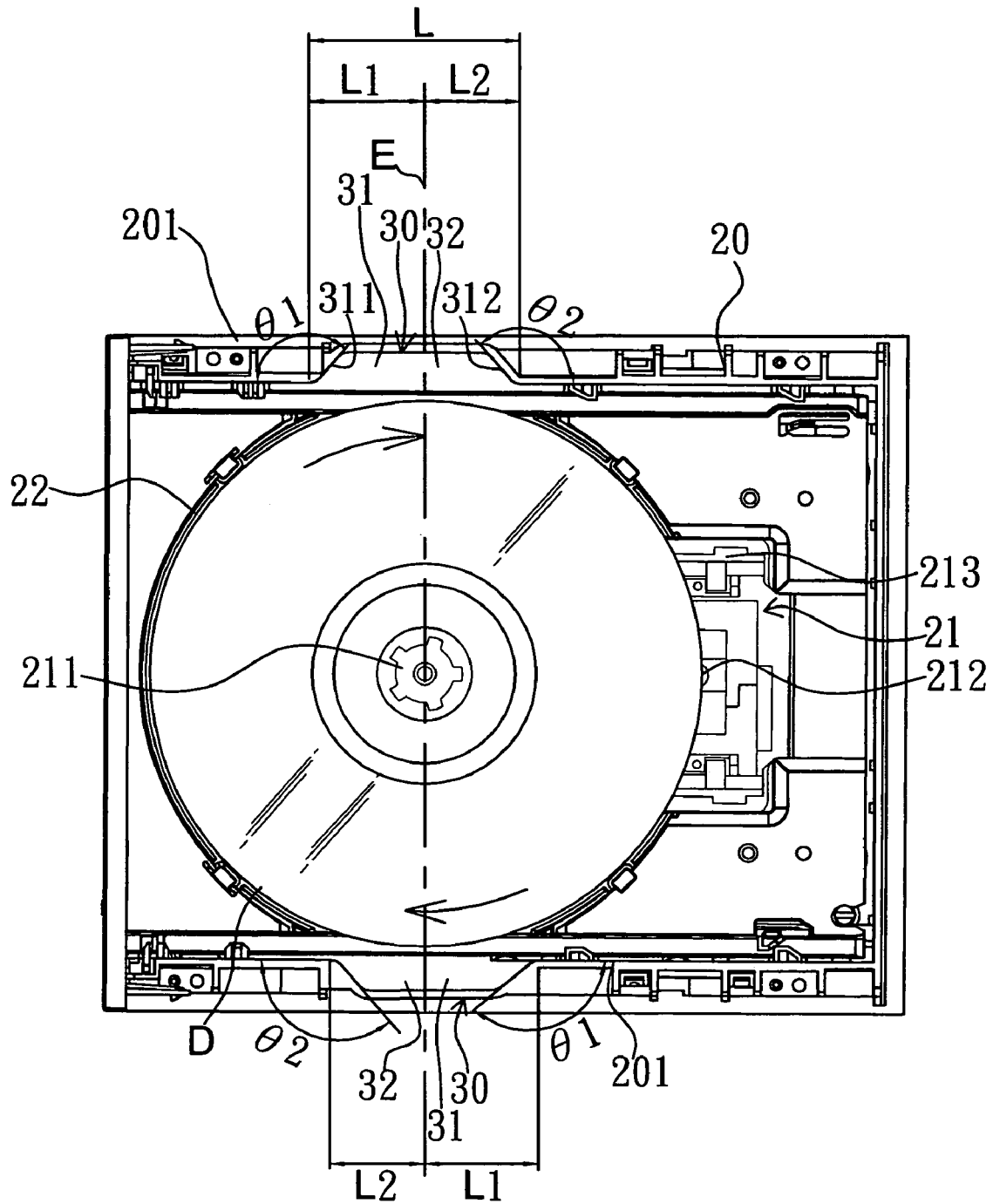
FIG. 5 is a top view of the mechanism for guiding airflows within the operating optical disc drive according to one embodiment of the present invention.
Figure 6:
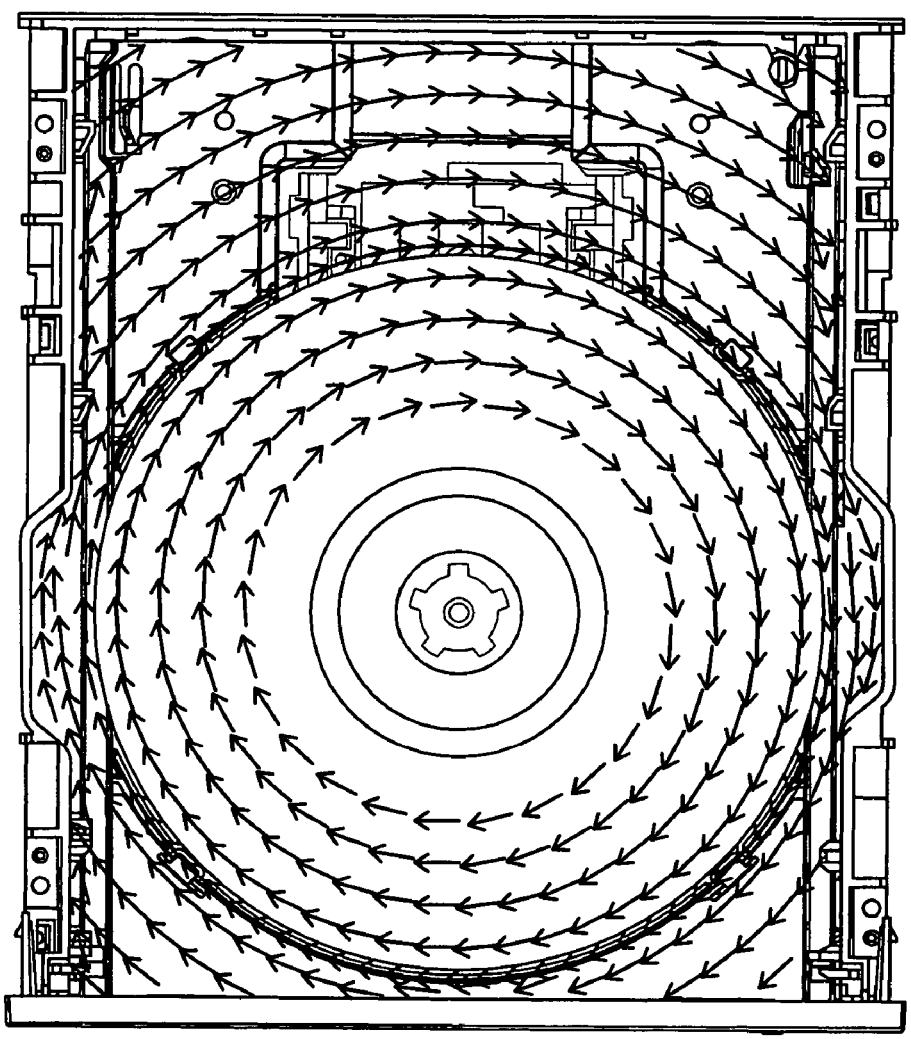
FIG. 6 is a view illustrating the airflow field produced by the revolving disc as shown in FIG. 5.

Please refer to FIGS. 5 and 6 in conjunction with FIG. 4, the guide mechanism is disposed on the chassis 20 and comprises two guide passages 30 at both side walls 201 of the chassis 20. In detail, the guide passage 30 is formed to protrude outwardly from the side walls 201 of the chassis 20 and comprises two guiding oblique surfaces 311 and 312 at its both ends, and an intermediate flat surface so that a recessed space is defined by the oblique surfaces 311 and 312 and the intermediate flat surface. Also, the guide passages 30 are positioned on extended lines of a diameter of the disc D normal to the side walls 201 of the chassis 20 as indicated by a dash line E. The guide passage 30 is further divided into two channels 31 and 32 by the dash line E. Further, according to the rotating direction of the disc D, the channel 31 where the airflows produced by the rotating disc D flows into is defined as a front channel 31. Alternatively, the channel 32 where the airflows produced by the rotating disc D flows out is defined as a rear channel 32. An angle θ1 formed by the front oblique surface 311 and the side wall 201 is an obtuse angle, and an angle θ2 formed by the rear oblique surface 312 and the side wall 201 of the chassis 20 is also an obtuse angle so that the airflows resulting from the revolving disc flows through the guide passages 30 smoothly. Preferably, length L1 of the front channel 31 is longer than length L2 of the rear channel 32 for increasing the amount of air flowing through both the front channel 31 and the rear channel 32 in per unit time when the disc D is revolving.

Referring to FIGS. 5 and 6 again, an operation of the guide mechanism is described in detail below. Airflow field produced by the revolving disc D is indicated by arrows in FIG. 6. The airflows can flow into the guide passage 30 and will not be compressed by the side walls 201. Specifically, the airflows flow into the guide passage 30 from the front channel 31 and flow out of the guide passage 30 from the rear channel 32. Further, the airflows can be guided by the oblique surface 311 and 312 to flow into and out of the channels smoothly. As the airflows are not compressed and flow smoothly, the air pressure above the disc D is balanced, and the shocks, jarring, and noise occurred in prior art are minimized.

Figure 7:
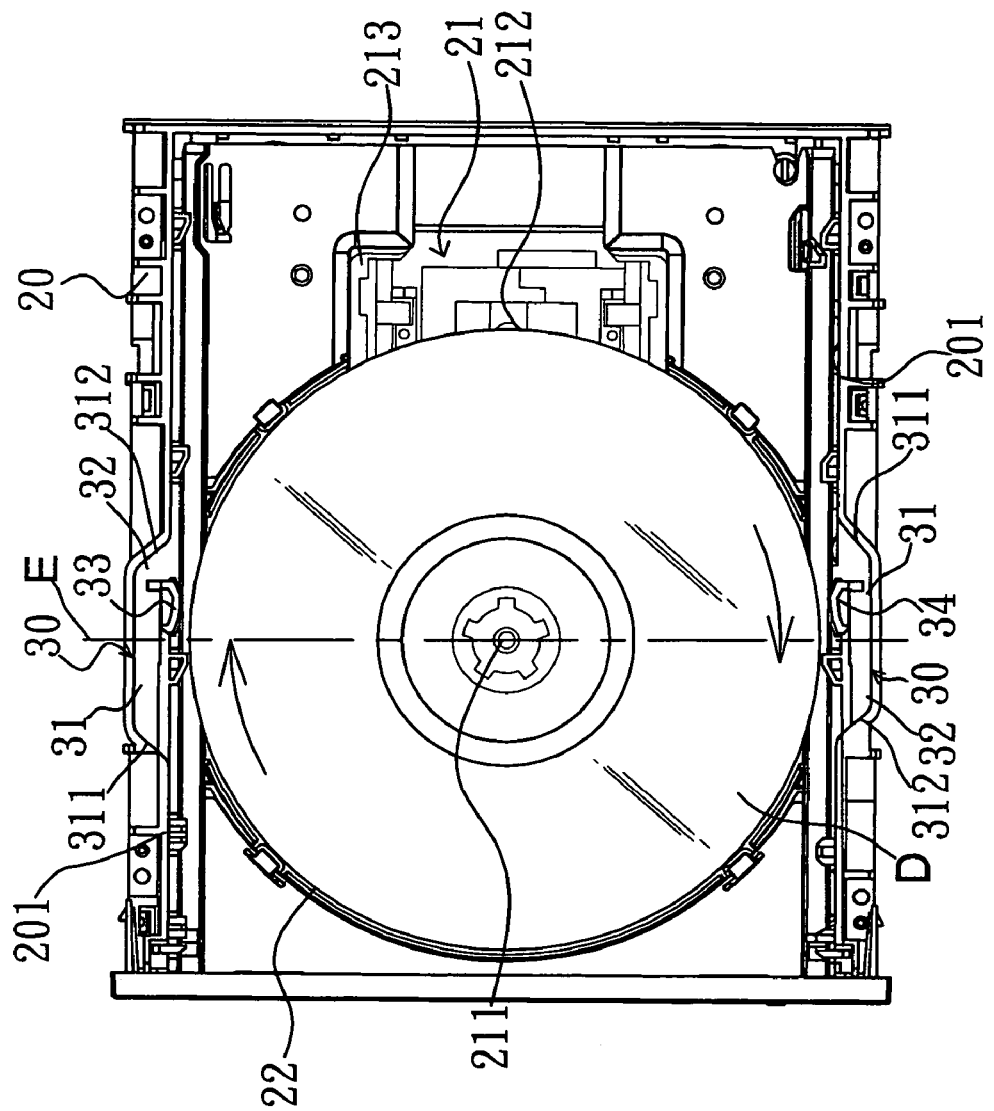
FIG. 7 is a top view of the mechanism for guiding airflows within the operating optical disc drive according to another embodiment of the present invention.
Figure 8:
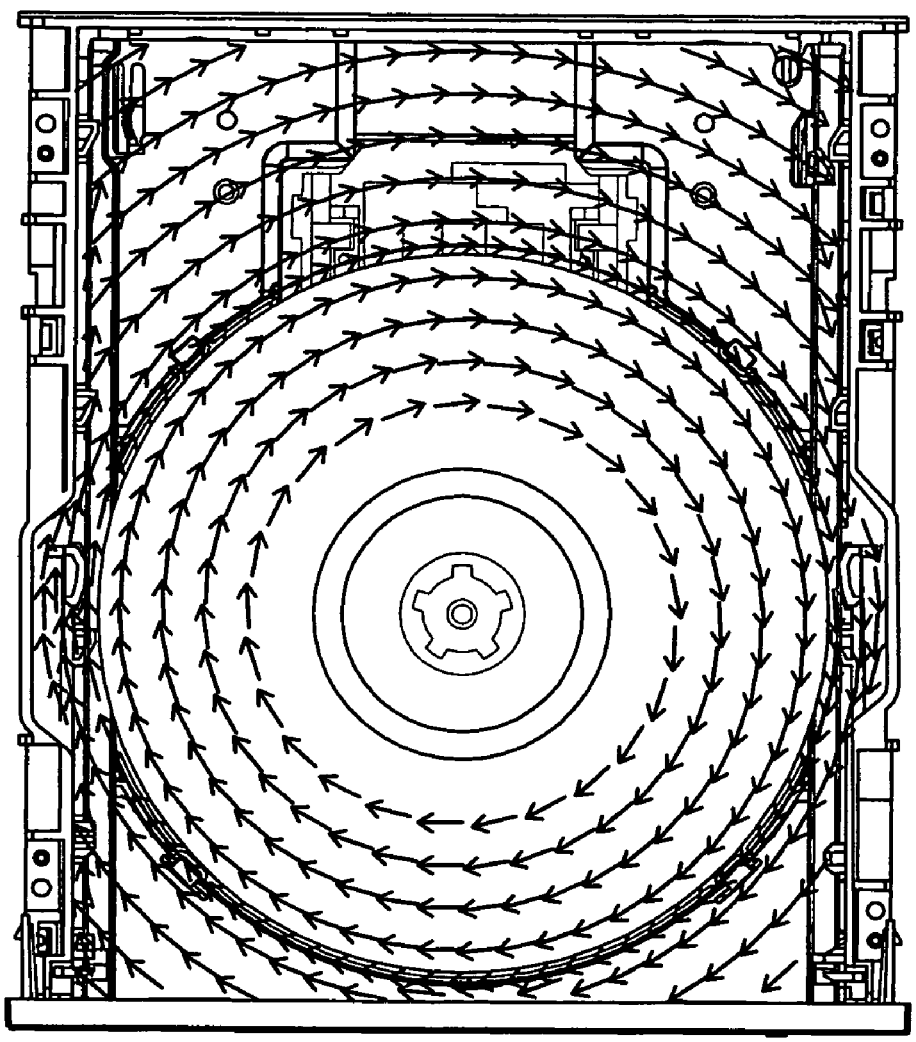
FIG. 8 is a view illustrating the airflow field produced by the revolving disc as shown in FIG. 7.

Referring to FIGS. 7 and 8, a guide mechanism provided in an optical disc drive for guiding airflows therein according to another preferred embodiment of the invention is shown. The guide mechanism shown in FIGS. 7 and 8 has substantially the same structure as the guide mechanism shown in FIGS. 4 and 5, and the same numbers in the figures indicate the same elements. The different is that the guide mechanism shown in FIG. 7 further comprises two upright ribs 33 and 34 vertically protruded from the chassis 20 and formed in the guide passages 30. Either rib 33 or 34 is formed in an arc shape. Further, the ribs 33 and 34 are adapted to position the disc D stably when the optical disc drive- is intended to be used in a vertical manner. As the ribs 33 and 34 are formed in an arc shape, the airflows are guided to smoothly flow into the guide passage 30 between the ribs 33 and.34 and the side walls 201. The air pressure above the disc D is balanced, and the shocks, jarring, and noise occurred in prior art are minimized.

While the invention herein disclosed has been described by means of specific embodiments, numerous modifications and variations could be made thereto by those skilled in the art without departing from the scope and spirit of the invention set forth in the claims.

What is claimed is:

1. A guide mechanism for guiding airflows within an optical disc drive, in which the optical disc drive includes a chassis having a side wall and a tray for loading or unloading a disc having a diameter of about 12 centimeters (cm), the guide mechanism comprises:
   at least one guide passage, protruded outwardly from the side wall of the chassis and having two guiding oblique surfaces at its both ends,
   wherein the guide passage is positioned on an extended line of a diameter of the disc normal to the side wall of the chassis and is located at the outside of the periphery of the disc, when the disc is loaded into the optical disc drive, and;
   a rib provided in the guide passage for positioning the loaded disc stably,
   thereby airflows produced by the revolving disc is guided to flow through the guide passage.

2. The guide mechanism of claim 1, wherein the rib is vertically protruded on the chassis.

3. The guide mechanism of claim 1, wherein the guide passage is divided into a front channel and a rear channel by the extended line of a diameter of the disc normal to the side wall of the chassis, and the airflows enter the guide passage at the front channel and exit at the rear channel.

4. The guide mechanism of claim 3, wherein a length of the front channel is longer than that of the rear channel.

5. The guide mechanism of claim 1, wherein an angle formed between each of the guiding oblique surfaces and the side wall of the chassis is an obtuse angle.

6. A guide mechanism for guiding airflows within an optical disc drive comprising:
   a chassis having a side wall, wherein the side wall has at least a guiding oblique surface and forms a guide passage between the guiding oblique surface and the peripheral of a loaded disc when the disc is loaded into the optical disc drive;
   a tray slidably disposed on the chassis for loading or unloading the disc; and
   a rib provided in the guide passage for positioning the loaded disc stably,
   wherein the guide passage is positioned on an extended line of a diameter of the disc normal to the side wall of the chassis.

7. The guide mechanism of claim 6, which comprises two guiding oblique surfaces forming on the side wall of the chassis.

8. The guide mechanism of claim 7, which further comprises an intermediate flat surface between the two guiding oblique surfaces.

9. The guide mechanism of claim 6, wherein the rib is vertically protruded on the chassis.

10. The guide mechanism of claim 6, wherein the guide passage is divided into a front channel and a rear channel by the extended line of a diameter of the disc normal to the side wall of the chassis, and the airflows enter the guide passage at the front channel and exit at the rear channel.

11. The guide mechanism of claim 10, wherein a length of the front channel is longer than that of the rear channel.

12. The guide mechanism of claim 6, wherein an angle formed between the guiding oblique surface and the side wall of the chassis is an obtuse angle.

* * * * *